US010864471B1

(12) United States Patent
Chaudhuri

(10) Patent No.: US 10,864,471 B1
(45) Date of Patent: Dec. 15, 2020

(54) IOT ENABLED SMART FILTER DEVICE

(71) Applicant: Sid Chaudhuri, East Brunswick, NJ (US)

(72) Inventor: Sid Chaudhuri, East Brunswick, NJ (US)

(73) Assignee: Sid Chaudhuri, East Brunswick, NJ (US)

( * ) Notice: Subject to any disclaimer, the term of this patent is extended or adjusted under 35 U.S.C. 154(b) by 0 days.

(21) Appl. No.: 16/882,474

(22) Filed: May 23, 2020

(51) Int. Cl.
| | |
|---|---|
| *G08B 21/00* | (2006.01) |
| *B01D 46/00* | (2006.01) |
| *G08B 21/18* | (2006.01) |
| *B01D 46/42* | (2006.01) |
| *B01D 46/54* | (2006.01) |
| *G01N 15/08* | (2006.01) |
| *G16Y 20/10* | (2020.01) |
| *H04W 84/04* | (2009.01) |

(52) U.S. Cl.
CPC ....... *B01D 46/0086* (2013.01); *B01D 46/429* (2013.01); *B01D 46/543* (2013.01); *G01N 15/0806* (2013.01); *G08B 21/182* (2013.01); *B01D 2279/50* (2013.01); *G01N 2015/084* (2013.01); *G16Y 20/10* (2020.01); *H04W 84/042* (2013.01)

(58) Field of Classification Search
CPC .............. B01D 46/0086; B01D 46/543; B01D 2279/50; B01D 46/429; G01N 15/0806; G01N 2015/084; G08B 21/182; H04W 84/042; G16Y 20/10

USPC ................ 340/607, 603, 606, 608, 619, 630
See application file for complete search history.

(56) References Cited

U.S. PATENT DOCUMENTS

| | | | | |
|---|---|---|---|---|
| 5,141,309 | A * | 8/1992 | Worwag | A47L 9/19 356/72 |
| 8,744,780 | B2 * | 6/2014 | Wilson, Jr. | G01N 21/59 702/34 |
| 2010/0313748 | A1 * | 12/2010 | Schluter | B01D 46/46 95/25 |
| 2017/0048709 | A1 * | 2/2017 | Patel | C02F 1/001 |
| 2018/0119973 | A1 * | 5/2018 | Rothman | G05B 15/02 |
| 2018/0140989 | A1 * | 5/2018 | Arthur | B01D 46/009 |
| 2019/0015768 | A1 * | 1/2019 | Alderman | B01D 46/10 |

* cited by examiner

*Primary Examiner* — Anh V La

(57) ABSTRACT

The present invention provides a smart air filter blockage detection and alert communication system for use with filters in air circulation systems such as HVAC, vehicles, server systems, and dryers. The system attached to the frame of a filter comprises a light source, a light sensor, two actuators and a control unit. The control unit based on a stored program or an external command activates the actuators to place the source and the sensor devices attached to the two arms of the actuators on the two sides of the filter membrane. The sensor measures the light intensity transmitted through the filter. The control unit upon receiving the intensity data determines the filter blockage level and communicates alert to the user when the blockage exceeds a predetermined value. The system uses a 4G or a 5G IoT network capability for data collection and communication with servers and user devices.

22 Claims, 11 Drawing Sheets

IOT ENABLED SMART FILTER DEVICE

FIELD OF THE INVENTION

This invention generally relates to air filters to capture airborne particulates in systems such as HVAC (Heating, Ventilation and Airconditioning), vehicles, dryers, and computer and server systems, and specifically to generate alerts to replace or clean the filters based on adjustable and predetermined filter blockage criteria and to communicate the alert to the users using IoT (Internet of Things) capability of the 4G and 5G wireless networks.

BACKGROUND OF THE INVENTION

This invention relates to an air filter system that generates and communicates an alert to the user when the blockage of the filter due to accumulated particulates reaches an adjustable predetermined threshold.

Air filters are used in a variety of systems to trap and remove undesirable particulates from an air stream in an air circulation system. Air filters are typically installed in the path of the air stream contained in an enclosure, conduit or duct in the air circulation system to capture dust and other undesirable particulates and to allow clean air to flow into the system. Examples of such applications include HVAC systems at residential and commercial buildings, vehicles, dryers, computer/server systems, and manufacturing equipment.

A filter structure includes a frame in which a semipermeable membrane is attached. The structure of the frame can be a simple frame like a picture frame. Some filters may have more elaborate shapes. For example, a vehicle filter may have an accordion like frame in which multiple fins or membranes are attached so that air passes through all of them increasing the level of cleanliness of the air that passed through such multi-membrane filters. A filter can have a circular shape in which membranes are attached in a cylindrical pattern. The filter membrane is made from a variety of materials including paper, cloth, plastic fibers, and other synthetic fibers.

As more air passes through a filter over time more debris are accumulated in the filter resulting in significant blockage of the airflow through the filter. The blockage of the filter causes air flow to diminish and to reduce the effectiveness of the air circulation system. Additionally, a clogged filter may dislodge some of the captured debris into the area for which the filter is used to supply clean air resulting in adverse health effect on users.

As a result, air filters used in air circulation systems need to be replaced or cleaned when there is significant blockage. Typically filter manufacturers recommend a certain period of usage when the filters should be replaced or cleaned. For example, it is recommended that residential HVAC system filters are replaced every three months. The recommendations are based on average usage conditions. It does not consider the specific situations such as ambient air quality, health requirements for specific users such as allergy, seasonal usage time, etc. In addition, users must remember when the replacements are due and carry out the replacements accordingly. Quite often users forget. Consequently, filters are generally replaced prematurely or too late for most effective operation of the air circulation systems.

Attempts have been made previously to provide more effective air filter systems addressing the problems mentioned above. Examples of such attempts are found in the U.S. Pat. Nos. 4,751,501, 5,772,711, 6,052,058, 6,320,513, 6,412,435, 6,443,010, 7,261,762, 7,726,186, 8,314,710, 9,080,784, 9,366,448, and 10,513,997. These systems require measurement of the differential airflows on two sides of a filter, detection of airflow reduction compared to a baseline airflow, measurement of noise created by a whistle installed in the filter that creates noise or vibration when sufficiently blocked, detection of back pressure caused by resistance to airflow when the filter is clogged, detection in rise of the temperature of an equipment not receiving sufficient airflow due to a clogged filter, etc. Some of the systems provide means for generating alert in the form of a sound signal such as a whistle or a light indicator. Other systems provide alerts that a filter needs to be replaced. There are several drawbacks of these systems. First, the devices to detect filter blockage by means of airflow, sound, or pressure differential etc. are not very accurate. Second, the alerts are generated based on a fixed amount of blockage that cannot be adjusted according to the need of specific users. Third, users still need to actively look for alerts for filter replacements.

Thus there is a need for a filter blockage detection and alert communication system that is accurate in blockage detection and adjustable to generate filter replacement alerts based on criteria according to a specific user's requirements, and that is smart in communicating with the users.

SUMMARY OF THE INVENTION

The present invention provides systems and methods for accurately detecting blockage of air filters used in a variety of systems including residential and commercial HVAC systems, vehicles, dryers, and computer and server systems. The present invention further provides alerts to users for timely replacement of clogged filters.

In accordance with the present invention, a filter detection and alert communication system comprises a housing, one or more light sources, one or more light sensors, a control unit, and one or more actuators. The control unit may include a logic circuit, a central processing unit (CPU) or a microcontroller unit (MCU) and a memory. The light sources, the light sensors, and the actuators are coupled to the control unit. The housing incorporating the light sources, light sensors, actuators and the control unit is attached to the frame of a filter either by means of brackets or clips. The control unit activates the actuators to extend the actuator arms based on an external command or the execution of a program logic stored in the memory. The light sources and the sensors are attached at the ends of two actuator arms of the one or more actuators.

In one aspect of the invention, the control unit turns on the light sources and activates the sensors after the sources and sensors are placed on the opposite sides of the filter membrane. The light sensors measure the intensity of light received at the sensors. The control unit receives the received light intensity data from the sensors. Once the measurement is completed the actuators pull in the actuator arms along with the light sources and the sensors into the housing so that the filter is no longer blocked by the sources and the sensors.

In another aspect of the invention, the control unit is programmed to periodically activate the actuators and to measure the light intensity transmitted through the filter. The control unit can also activate the actuators and direct the light sensors to measure the light intensity transmitted through the filter upon receiving an external command. The control unit processes the measured intensity data to determine if the filter has reached a blockage threshold stored in the memory of the control unit. The control unit may perform data analysis such as averaging of multiple data points for the determination of reaching the threshold. The control unit is coupled with a wireless network for communication with the user devices.

In yet another aspect of the invention, the control unit is coupled with a server computer via a wireless network such as a 4G or a 5G cellular network with IoT capability or a WiFi network. The control unit sends light intensity data received from the light sensors along with its identification (ID) to the server computer using the IoT network capability. The server computer processes the received light intensity data to determine whether the filter blockage has reached a predetermined threshold. If so, the server computer sends an alert message to a user's device such as a mobile phone.

In yet another aspect of the invention, a server computer collects filter blockage data, their location data and ID from a plurality of smart air filter devices coupled with the server computer via IoT enabled wireless networks or a combination of WiFi and cellular networks. The server computer determines when the filter needs to be replaced or cleaned based on a predetermined threshold of blockage for each of the filters and schedules service with the service providers for filter replacement service. For example, a car service center can set up appointments with its customers based on the alerts received from the server computer. Additionally, the server computer can perform statistical data analysis from a set of smart filter devices in a given geographic region based on the location data to determine an average lifecycle of the filters in the region. Based on this determination a car manufacturer can set the filter replacement recommendation tailored to the specific geographic areas that depend on the air quality in the region or seasonal dependence of the air quality in the region. A car manufacturer can use the statistical data to design and install filters tailored to the needs of the geographical regions.

DETAILED DESCRIPTION

Figure 1:
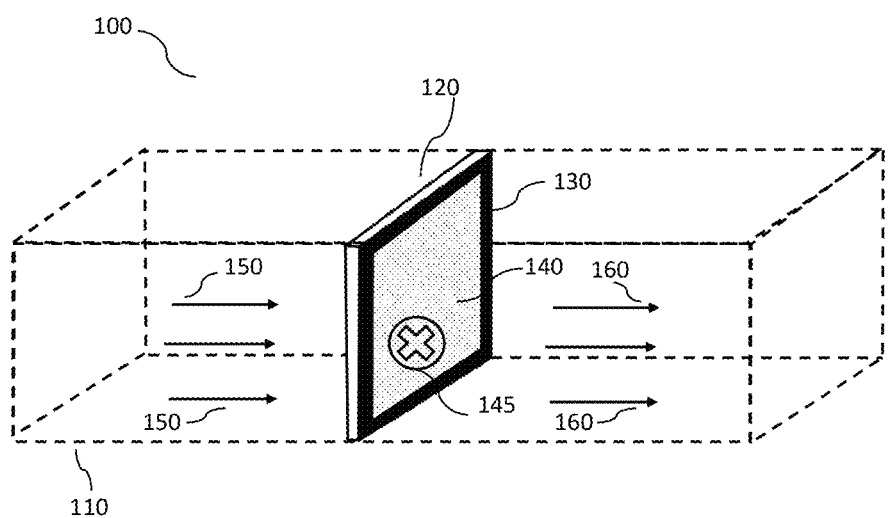
FIG. 1 depicts a schematic diagram of the salient components of an air filter circulation system including an air filter and a conventional blockage detection device.

FIG. 1 depicts the salient components of an air circulation system 100. An air filter 120 is installed in an air duct 110. The air filter comprises a frame 130 on which a filter membrane 140 is attached. The filter membrane is a semi-permeable medium made from a variety of materials including paper, cotton fabric, and synthetic fiber. A motorized fan (not shown) causes outside air to flow as an incoming air stream 150 into the duct 110. Air from the incoming flow 150 passes through the filter 120 and flows out as outgoing air stream 160. Dust and other particulates in the incoming stream 150 are captured by the filter 120 and cleaner air goes out into the outgoing stream 160. Over a period of time as more air passes through the filter 120 more particulates are deposited into the filter 120 and more the filter is blocked rendering the filter less effective. A conventional blockage detection device such as a whistle 145 makes noise based on the differential pressure between the incoming flow 150 and outgoing flow 160 caused by the blockage. The noise is used as an alert for replacing or cleaning the filter 120. Other conventional means of blockage detection may include measurement of the differential air pressure.

Figure 2A:
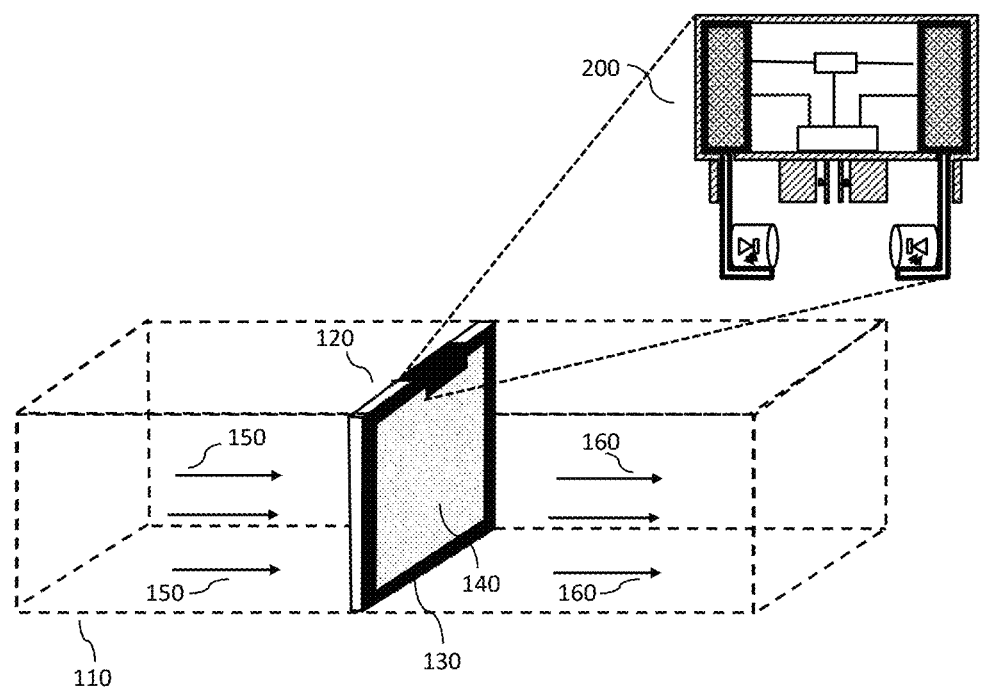
FIG. 2A depicts a schematic diagram in a cross-sectional view of a filter blockage determination and alert communication system in accordance with the current invention.

FIG. 2A depicts a schematic diagram in a vertical cross-sectional view of a filter blockage detection and alert communication system generally designated as 200 in accordance with the current invention. The filter blockage detection and alert communication system 200 is mounted on the filter frame 130 of the filter 120 by means of a clip or a bracket with screws. Alternatively, the system 200 can be mounted on the duct or the frame of the air circulation system (not shown). The structural components of the filter frame 130 or the frame of the air circulation system, the mounting structures, and the mounting hardware are not shown in the diagram.

Figure 2B:
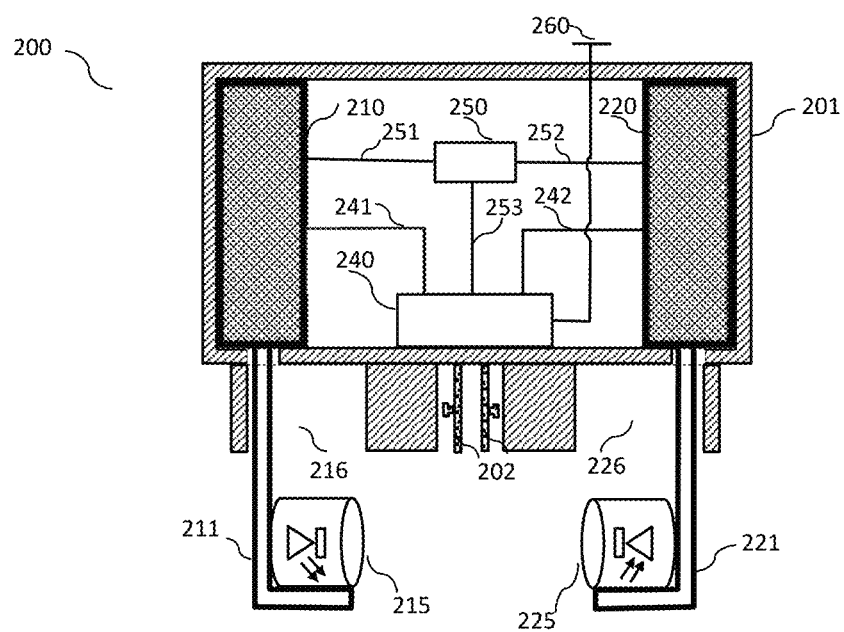
FIG. 2B depicts a schematic diagram in a vertical cross-sectional view of the salient components of the filter blockage detection and alert communication system in accordance with a first embodiment of the current invention.

FIG. 2B depicts a schematic diagram in a vertical cross-sectional view of the salient components of the filter blockage detection and alert communication system 200 in accordance with an embodiment of the current invention. The system 200 comprises a housing 201, a mounting device 202, two actuators 210 and 220, an energy source device 215, an energy sensor device 225, a control device 240, an electric power source 250, and an antenna 260. The mounting device can be a clip or a bracket for mounting the system 200 onto the frame 130 of the filer 120. Alternatively, the system 200 can be mounted with the mounting device 202 onto a duct or another element of an air circulation system. The control device 240 is coupled with the actuators 210 and 220 via the control links 241 and 242, respectively. The energy source device 215 is attached at the end of the actuator arm 211 of the actuator 210. The energy sensor device 225 is attached at the end of an actuator arm 221 of the actuator 220. The power source 250 is a battery. Alternatively, the power source is a power unit coupled with an external power source such as a vehicle battery, an air circulation system power unit, or a gird power wall socket, from which power is drawn by the power source 250. The power source 250 provides electric power to the actuators 210 and 220 via the wirings 251 and 252, respectively, and to the control device 240 via the wiring 253.

The actuator 210 extends its actuator arm 211 responsive to a first control signal received from the control device 240. When the arm 211 is extended the energy source device 215 attached at the end of the arm 211 is placed at a location on a first side of the filter membrane 140. The actuator 210 retracts its arm 211 responsive to a second control signal received from the control device 240. When the arm 211 is fully retracted the energy source device 215 is pulled into the cavity 216 for storage inside the housing 201. The actuator 220 extends its actuator arm 221 responsive to a third control signal from the control device 240. When the actuator arm 221 is extended the energy sensor device 225 attached at the end of the arm 221 is placed at a location on the second side of the filter membrane 140. The extensions of the actuator arms 211 and 221 are equal so that the energy source device 215 and the energy sensor device 225 are located on the opposite sides of the membrane 140 and directly facing each other in close proximity to but not touching the filter membrane 140. The actuator 220 retracts its arm 221 responsive to a fourth control signal received from the control device 240. When the arm 221 is fully retracted the energy sensor device 225 is pulled into the cavity 226 for storage inside the housing 201.

The actuator 210 or a separate actuator (not shown) can pull in a first screen (not shown) beneath the cavity 216 when the arm 211 is retracted and the energy source device 215 is stored in the cavity 216. The actuator 220 or yet another actuator (not shown) can pull in a second screen (not shown) beneath the cavity 226 when the arm 221 is retracted and the energy sensor device 225 is stored in the cavity 226. The purpose of the screens is to keep the energy source device 215 and the energy sensor device 225 free of dust and other particulates in the air circulation system. Additionally, brushes (not shown) may be installed on the side walls of the cavities 216 and 226 so that when the energy source and sensor devices are pulled into the cavities the front surfaces of the source and sensor devices are automatically cleaned.

The antenna 260 is coupled with the control device 240 and a wireless network. The control device 240 communicates with external devices and systems via the antenna 260 and the wireless network. Antenna 260 can be selected from a variety of well know antenna technologies. For example, the antenna can be a dipole or fractal type and can be laid on the surface of the housing. The antenna is to be selected appropriate for communication with the wireless network technology.

Figure 3:
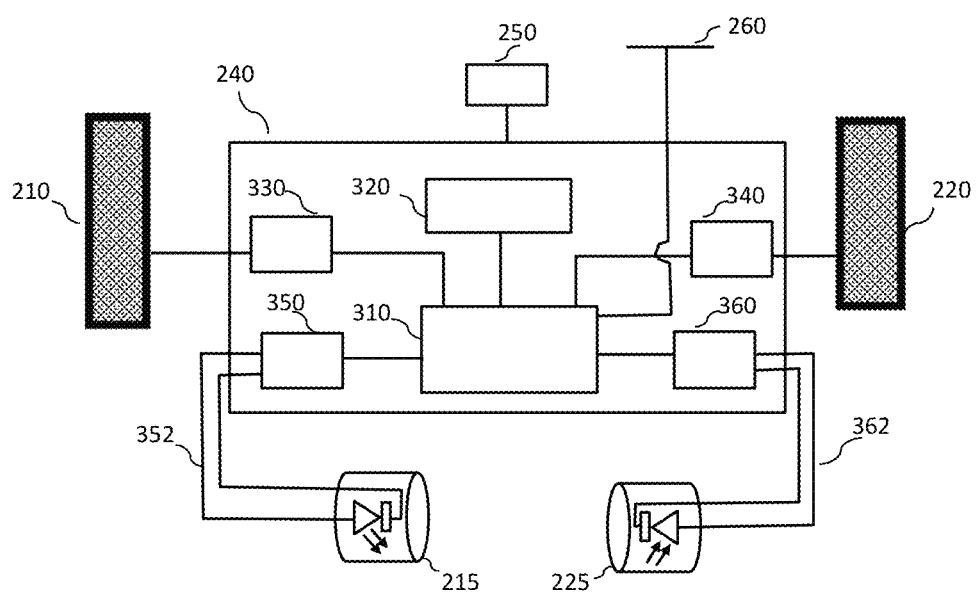
FIG. 3 depicts a schematic diagram of the salient components of a control unit in the filter blockage detection and alert communication system in accordance with an embodiment of the current invention.

FIG. 3 depicts a schematic diagram of the salient components of the control device 240 in the filter blockage detection and alert communication system 200 in accordance with an embodiment of the current invention. The control device 240 comprises a central processing unit (CPU) or a microcontroller unit (MCU) 310, a memory unit 320, a first actuator controller 330, a second actuator controller 340, an energy source controller 350, and an energy sensor controller 360. The memory unit 320 is coupled with the processing unit 310 via data lines. The memory unit 320 can also be an integral part of the processing unit 310. A software or a firmware program is stored in the memory unit 320. The processing unit 310 is coupled with the actuator controllers 330 and 340 via control data lines. The processing unit 310 is coupled with the antenna 260 to receive and send wireless communication data. The processing unit 310 is coupled with the energy source controller 350 via control data lines. The processing unit 310 is coupled with the energy sensor controller 360 via control data and measurement data lines.

The software program includes instructions for the processing unit 310 to conduct blockage measurement periodically. The periodicity of the measurements and the time of the measurement can be specified and changed in the program. At the instant of instructed measurement time, the processing unit 310 sends a first control signal to the actuator controller 330 and sends a second control signal to the actuator controller 340. The actuator controllers 330 and 340 in response to receiving the control signals from the processing unit 310 activate the actuators 210 and 220, respectively. Being activated the actuators 210 and 220 extend the arms 211 and 221 to place the energy source device 215 and energy sensor device 225, respectively, on two sides of the filter membrane 140. The actuator controllers 330 and 340 send a completion signals to the processing unit 310 when the controllers 330 and 340 have completed the extensions of the actuator arms.

Upon receiving the completion signals from the actuator controllers 330 and 340, the processing unit 310 sends measurement command signals to the energy source device controller 350 and the energy sensor controller 360. The energy source controller 350 is coupled with the energy source device 215 via the power lines 352. The energy source controller 350 upon receiving the measurement command signals commands a power source to power on the energy source device 215. The energy source controller 350 can also adjust the amount of current or power driven into the energy source device 215. The energy source controller 350 can derive power from the power source 250 and supply power to the energy source device 215. Alternatively, the power lines 352 can be coupled with the actuator 210 or the power source 250 directly. In that case, the controller 350 sends a control signal to the actuator 210 or the power source 250 to power on the energy source device 215. The energy sensor controller 360 is coupled with the energy sensor device 225 via the power and data lines 362. The energy sensor controller 360 upon receiving the measurement command signals commands a power source to power on the energy sensor device 225. The energy sensor controller 360 can derive power from the power source 250 and supply power to the energy sensor device 225. Alternatively, the power lines of the power and data lines 362 can be coupled with the actuator 220 or the power source 250 directly. In that case, the controller 360 sends a control signal to the actuator 220 or the power source 250 to power on the energy source device 225. When the energy sensor device 225 is powered on the energy sensor device takes measurement of the intensity of the energy received. It is to be noted that the intensity is specifically defined as the energy received per unit area per unit time. Therefore an intensity measurement is considered in the current context to be equivalent to measurement of energy in a given area such as the area of the energy sensor and for a period of time such as the measurement duration. The energy sensor device 225 sends the measured energy intensity data to the energy sensor controller 360 via the data lines of the power and data lines 362. The energy sensor controller 360 sends the measured data to the processing unit 310. The actions of turning on power to the energy source and sensor devices and taking measurements can also be done automatically when the extensions of the actuation arms are completed without the need for explicit measurement signals.

The processing unit 310 determines when the measurement is completed based on the energy intensity data received from the energy sensor controller 360. Upon the determination of the completion of the measurement, the processing unit 310 sends measurement completion signals to the energy source and sensor controllers 350 and 360. The controllers 350 and 360 then turn off the power to the energy source and sensor devices 220 and 230 and send arm retraction signals to the actuator controllers 330 and 340, respectively. The actuators upon receiving the retraction signals retract the arms to stow away the energy source and sensor devices 215 and 225 in their respective cavities.

The processing unit 310 analyzes the energy intensity data received from the energy sensor controller 360. The processing unit 310 may store the intensity data from multiple measurements. The processing unit 310 uses the data from a single measurement or multiple measurements to determine the degree of blockage of the filter 120. The processing unit 310 can use a simple method of blockage determination by comparing the intensity value from the current measurement with a baseline intensity. The processing unit 310 can use other methods to determine a current average value of the energy intensity. For example, the processing unit 310 can take the average of the intensity from several of the latest measurements and compare the average value with the baseline intensity. In another example, the processing unit can perform statistical analysis of the energy intensity data trend over time. Based on the comparison or the trend analysis, the processing unit 310 determines the degree blockage of the filter 120. When the degree of blockage exceeds a predetermined blockage threshold value stored in the memory 320 the processing unit 310 generates an alert message and communicates the message to an end user device.

The baseline intensity value can be the intensity value measured for the first time after a new filter is installed and the blockage detection and communication system is reset. Alternatively, a known value based on prior measurements on a particular type of filter can be stored in the memory 320. The blockage threshold value is determined by the user and can be based on the user's specific requirements such as health conditions and air quality in the environment. The user can change the threshold value anytime and for any reason. For example, after receiving the alert the user may decide to continue to use the filter as is after a visual inspection of the filter for a period of time. Then the user can send a new threshold value to the processing unit 310 for storage in the memory 320.

Figure 4A:
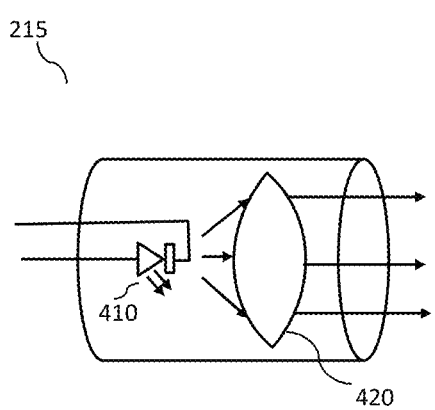
FIG. 4A depicts a schematic diagram of the salient components of a light source in a first embodiment in accordance with the current invention.

FIG. 4A depicts a schematic diagram of the salient components of the energy source device 215 in a first embodiment in accordance with the current invention. The energy source device 215 comprises a light source device 410 in the form of a light emitting diode (LED) or a laser diode (LD) and a convergent lens 420. The light source device 410 is located at the second focal point of the lens 420. The arrangement allows the light from the device 410 to emerge from the lens 420 as uniform parallel light rays hitting the air filter membrane 140. The uniformization can also be achieved by means of a curved mirror placed on the back side of the light source.

Figure 4B:
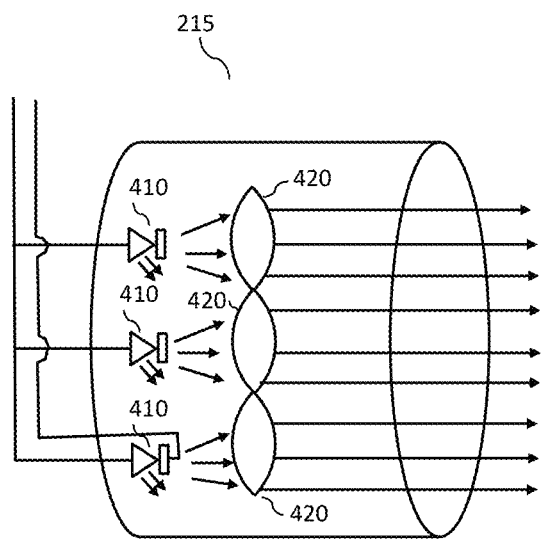
FIG. 4B depicts a schematic diagram of the salient components of the light source in a second embodiment in accordance with the current invention.

FIG. 4B depicts a schematic diagram of the salient components of the energy source device 215 in a second embodiment in accordance with the current invention. The energy source device 215 comprises a plurality of light source devices 410 in the form of LEDs or LDs and a plurality of convergent lenses 420. Each of the light source devices 410 is located at the second focal point of each of the corresponding lenses 420. The arrangement allows light from the devices 410 to emerge from the lenses 420 as a larger area wide uniform light compared to the first embodiment described earlier.

Figure 5A:
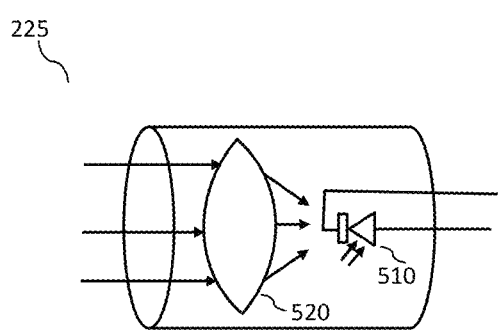
FIG. 5A depicts a schematic diagram of the salient components of a light sensor in a first embodiment in accordance with the current invention.

FIG. 5A depicts a schematic diagram of the salient components of the light sensor device 225 in a first embodiment in accordance with the current invention. The energy sensor device 225 comprises a light sensor device 510 and a convergent lens 520. The light sensor device 510 can be selected from a variety of photosensor technologies including PIN photodiode, avalanche photodiode (APD), photoresistor, quantum dot photodiode, charge coupled device (CCD), etc. The light sensor device 510 is located at the first focal point of the lens 520. The arrangement allows the light transmitted through the filter membrane to be focused onto the light sensor device 510. The focusing can also be achieved by means of a curved mirror placed on the back side of the light sensor device 510.

Figure 5B:
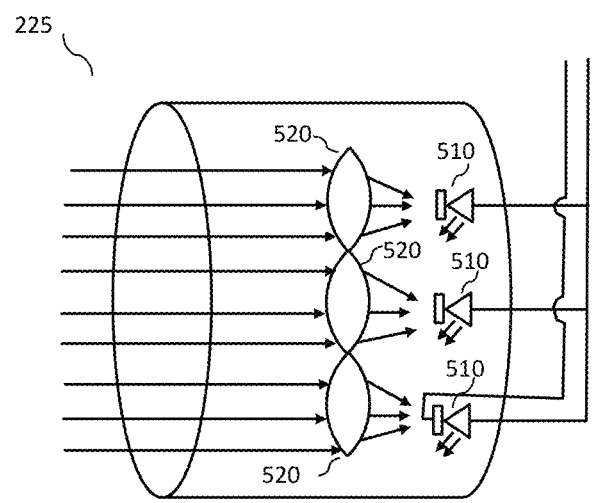
FIG. 5B depicts a schematic diagram of the salient components of the light sensor in a second embodiment in accordance with the current invention.

FIG. 5B depicts a schematic diagram of the salient components of the energy sensor device 225 in a second embodiment in accordance with the current invention. The energy sensor device 225 comprises a plurality of light sensor devices 510 and a plurality of convergent lenses 520. The light sensor devices 510 can be selected from a variety of photosensor technologies including PIN photodiode, avalanche photodiode (APD), photoresistor, quantum dot photodiode, charge coupled device (CCD), etc. The light source devices 510 are located at the first focal points of the corresponding lenses 520. The arrangement allows the light transmitted through a wider area of the filter membrane to be focused onto the light sensor devices 510.

The frequency of the light to be used can be selected either in the visible frequency spectrum or in the infrared frequency spectrum.

Figure 6:
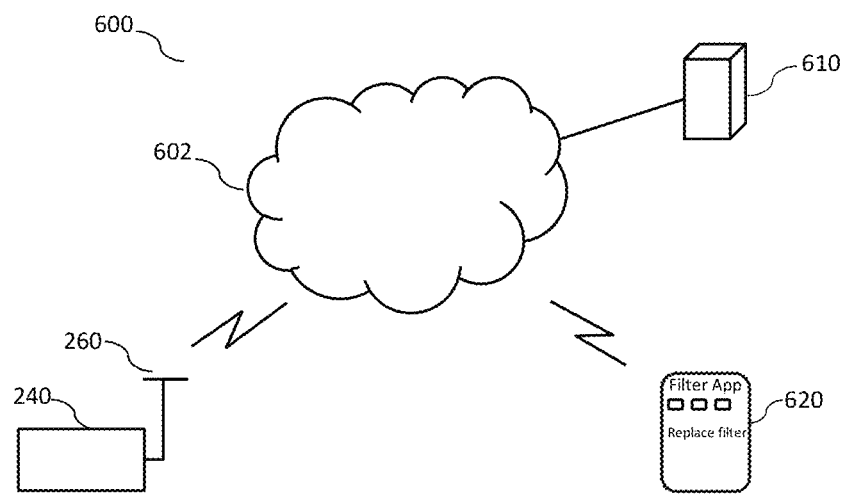
FIG. 6 depicts a schematic diagram of the salient components of a communication system in accordance with the current invention.

FIG. 6 depicts a schematic diagram of the salient components of a communication system 600 in accordance with the current invention. The communication system comprises the control device 240, the antenna 260, a wireless network 602, a server computer 610, and a user device 620. The antenna 260, the server computer 610 and the user device 620 are coupled via the network 602. Typically, the server computer is coupled with the network via wired connection such as fiber optics links. The user device is typically a mobile phone coupled with the wireless network by radio links. The control device 240 is typically coupled with the wireless network via radio link between the antenna 260 and one or more base station antennae in the wireless network 602. The control device 240 can also be coupled with the server computer 610 and the user device 620 via a combination of a WiFi network and a wireless or wireline network.

The system 200 can advantageously use the IoT capabilities of the wireless network 602. The IoT capabilities are based on technology standards defined by International Telecommunication Union (ITU) and 3GPP (3rd Generation Partnership Project—a telecommunications industry consortium). Devices and networks compliant with IoT standards specifications such as 3GPP TR 36.752 and ITU-T Y-2060 have several advantages. For example, the communication protocols and bandwidth requirements are defined specifically for efficient usage by a significantly greater number of IoT devices for shorter bursts of communications compared to the requirements for human to human or human to machine communications. Because of standards based devices are used worldwide the components required to implement IoT features in devices are cheaper. The IoT capability provides the necessary infrastructure including communication protocols, security, device and network management, bandwidth specifications, etc. for device to device in other words among things communications. Thus, it is advantageous for the control device 240 to utilize the IoT capabilities for short and bursty communications with the computer server 610 and the user device 620.

The user device 620 includes an application program for communication with the filter alert and communication system 200. When an alert message is received from the system 200 directly or from the server 610, the application program is activated, and an appropriate alert is displayed on the user interface of the application program in the device 620. In addition to receiving alert messages, the user can send a filter status enquiry to the system 200 or to the server 610. In response to the enquiry the system 200 or the server 610 sends the current filter status information for display on the user interface on the screen of the user device 620. Furthermore, the user can send a new blockage threshold value to the system 200 or the server computer 610 and the system stores the new threshold value in the memory. The alert message can also be in the form of a text message to the user device 620.

The filter device 200 set up can be easily accomplished with the application program. For example, the user can download the application program from the blockage detection system manufacturer's website. The application program when opened asks the user to insert the device 200 ID which is typically printed on the device. The application program then automatically communicates with the server to set up the user's account, to register and to activate the system 200.

The energy source and sensor devices 215 and 225 in the embodiments described in reference to FIGS. 4 and 5, the energy source device 215 is a light energy source device and the energy sensor device 225 is a light energy sensor device. In another embodiment, the energy source device 215 is an acoustic energy source device. The acoustic energy source device can be in the form of a microphone. The energy sensor device 225 is an acoustic transducer which converts the received acoustic energy into an electrical signal. The transducer can be a piezoelectric device which converts received acoustic wave pressure into an electrical signal and amplifies the electric signal.

Figure 7:
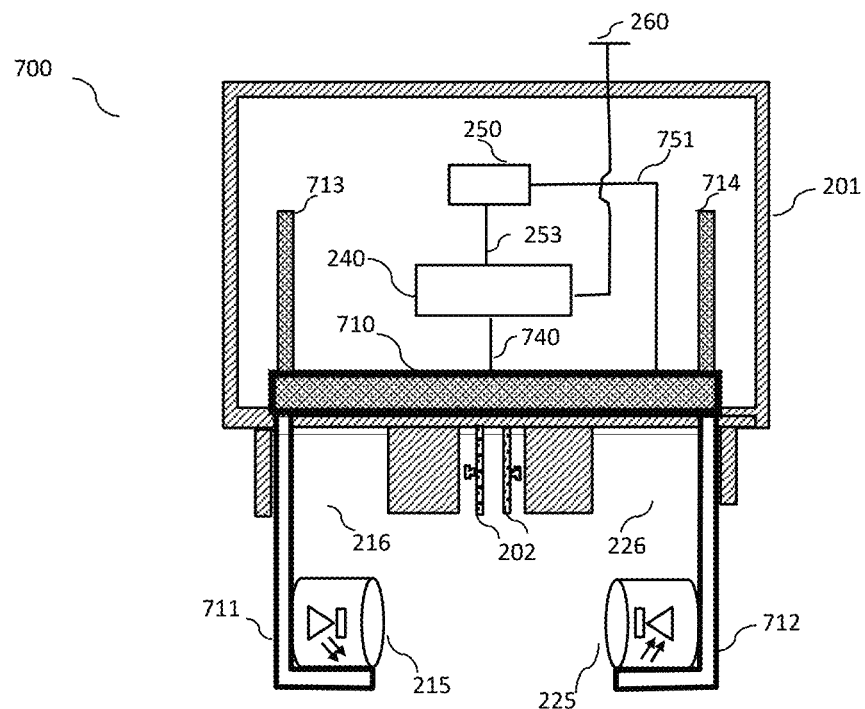
FIG. 7 depicts a schematic diagram in a vertical cross-sectional view of the salient components of the filter blockage detection and alert communication system in accordance with a second embodiment of the current invention.

FIG. 7 depicts a schematic diagram in a vertical cross-sectional view of the salient components of a filter blockage detection and alert communication system 700 in accordance with another embodiment of the current invention. In this embodiment the control device 240 is coupled to a single actuator 710 via the control link 740. The actuator 710 includes two arms 711 and 712 at the end of which the energy source device 215 and the energy sensor device 225 are attached, respectively. The power source 250 is coupled with the actuator 710 via a power line 751. The actuator 710 includes extensions 713 and 714 in the body of the actuator for the arms 711 and 712 to be retracted into. The control of the actuator 710 and the rest of the operation of the filter blockage detection and alert communication system 700 are identical to the system 200.

Figure 8:
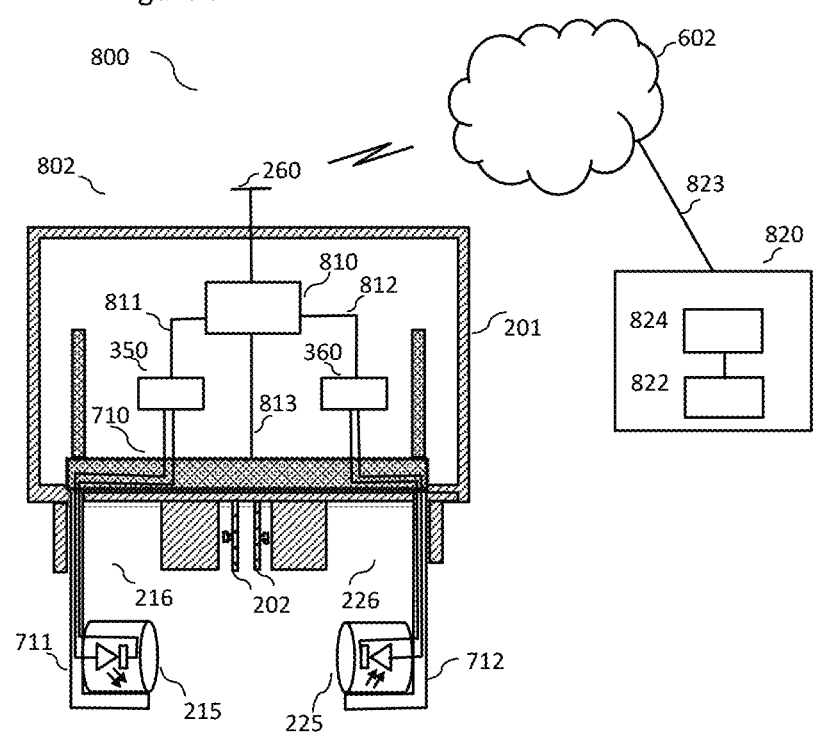
FIG. 8 depicts a schematic diagram in a vertical cross-sectional view of the salient components of the filter blockage detection and alert communication system in accordance with a third embodiment of the current invention

FIG. 8 depicts a schematic diagram in a vertical cross-sectional view of the salient components of a filter blockage detection and alert communication system 800 in accordance with yet another embodiment of the current invention. In this embodiment the system 800 comprises an energy measurement device 802 and a server computer 820. The energy measurement device 802 comprises the housing 201, the energy source unit 215, the energy sensor unit 225, the actuator 710, the actuator arms 711 and 712, the bracket 202, the energy source controller 350, the energy sensor controller 360, the antenna 260, and a communication device 810. The actuator 710 can also be replaced by the two actuators 210 and 220 in the embodiment of FIG. 2B. The communication device 810 is coupled with the energy source controller 350 via the control link 811, with the sensor controller 360 via the control link 812, with the actuator 710 via the control link 813 and with the network 602 via the antenna 260. The computer server comprises a CPU 822 and a memory 824. The computer server 820 is coupled with the network 602 via a network link 823.

In the embodiment of FIG. 8, the server computer 820 performs the processing operations for the system 800. A software program is stored in the memory unit 824. The program includes instructions for the CPU 822 to conduct blockage measurement periodically. The periodicity of the measurements and the time of the measurement can be specified and changed in the program. At the instant of instructed measurement time, the CPU 822 sends actuator control signals to the energy measurement unit 802 for the control of the actuator 710. The communication device 810 receives the actuator control signal via the network 602, converts the control signal into an appropriate format for the actuator controller in the actuator 710. Responsive to the actuator control signal the actuator 710 places the energy source and sensor device 215 and 225 onto two sides of the filter membrane 140. The actuator controllers send a completion signal to the communication device 810 for communication with the server 820. The communication device 810 formats and sends the formatted completion signal to the server 820 via the network 602. Upon receiving the completion signal the CPU 822 sends activation signals to the energy source and sensor devices 215 and 216 via the communication device 810. Upon receiving the activation signals the energy source device 215 and the energy sensor device 225 are powered on. The energy sensor device 225 then measures a quantity of the portion of the energy generated by the energy source device 215, transmitted through the membrane of the filter 120 and received at the energy sensor device 225. The energy sensor control device 360 sends the measured energy data to the communication device 810. The communication device 810 performs necessary format conversion on the measured data and sends the data to the server computer 820. Using the measured energy data, the server computer 820 performs the processing operations as described in reference to earlier embodiments. Based on the data processing and analysis, the computer server 820 generates an alert and sends the alert to the user device.

Certain features are of utility and may be employed in the filter blockage detection and alert communication system of the invention. For example, the blockage alert and communication system can include a GPS chip. Based on the GPS data and the blockage data from a large number of filters in a particular area the server can determine the degree of blockage dependent on the air quality in the region. Based on the statistical data analysis of a number of filter blockage devices, the server 610 can develop filter replacement guidelines specifically for the geographical region. A manufacturer such as a car manufacturer can specify filter replacement guidelines customized for each geographical region. The server can send a service alert signal to a service provider such as a car service center when the vehicle of the customer needs to be serviced for filter replacement. Based on the notification the car service center can schedule an appointment with its customer. In another example, the actuators can be both linear and rotational so that the energy source and sensor devices can be placed at different locations to take blockage measurements at different locations of the filter membrane.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative and are not necessarily drawn to scale. Reference throughout the specification to "first embodiment" or "second embodiment" or "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "first embodiment," "second embodiment," "third embodiment," "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A filter apparatus for use with a filter comprising: a control device, one or more actuators, an energy source device, and an energy sensor device;
    wherein the one or more actuators place the energy source device and the energy sensor device on two opposite sides of a membrane of the filter responsive to one or more actuation control signals received from the control device;
    wherein the energy source device and the energy sensor device are activated responsive to one or more activation signals received from the control device; and
    wherein the energy sensor device upon activation takes a measurement of the value of a quantity of energy received by the energy sensor device; and
    wherein the quantity of energy is a portion of the energy generated by the energy source device and transmitted through the filter.

2. The apparatus of claim 1 wherein the filter apparatus further comprising one or more antennae;
    wherein the control device receives the value of the quantity of energy and determines if the value is less than or equal to a predetermined threshold value of the quantity of energy;
    wherein the control device generates an alert signal based on the determination; and
    wherein the control device communicates the alert signal to a user device or to a server computer via the one or more antennae.

3. The apparatus of claim 1 wherein the filter apparatus further comprising one or more antennae;
    wherein the control device determines the value of a blockage parameter based on the value of the quantity of energy;
    wherein the control device compares the value of the blockage parameter with a predetermined maximum value of the blockage parameter;
    wherein the control device generates an alert signal based on the comparison; and
    wherein the control device communicates the alert signal to a user device or to a server computer via the one or more antennae.

4. The apparatus of claim 1 wherein the control device is compliant with IoT standards specifications defined by 3GPP and or ITU organizations; and wherein the control device uses the IoT capabilities defined in the IoT standards specifications to interface with a 4G or a 5G network and to communicate with a user device or a server computer.

5. The apparatus of claim 1 further comprising a housing for the apparatus and a bracket or a clip;
    wherein the bracket or the clip is attached to the housing; and
    wherein the housing is mounted by using the bracket or the clip on the frame of the filter or on a part of the body of an air circulation system in which the filter is installed.

6. The apparatus of claim 1 wherein the control device comprises a processing unit, an energy source controller, an energy sensor controller, a first actuator arm, a second actuator arm, one or more actuator controllers, and a memory unit;
    wherein the energy source device is attached at to the first actuator arm;
    wherein the energy sensor device is attached to the second actuator arm;
    wherein the control device generates and sends the one or more actuation control signals in response to a computer program stored in the memory unit and run in the processing unit;
    wherein the one or more actuators extend the first actuator arm and the second actuator arm along with the energy source device and the energy sensor device attached to the arms, respectively, to place the energy source device and the energy sensor device at the two sides of the membrane of the filter responsive to the one or more actuation control signals; and
    wherein the control device generates and sends the one or more activation signals to the energy source controller and the energy sensor controller responsive to the computer program run in the processing unit.

7. The apparatus of claim 2 wherein the control device receives a message to change the predetermined threshold value to a new predetermined threshold value; and wherein upon receiving the message the control device replaces the predetermined threshold value with the new predetermined threshold value in a memory in the control device.

8. The apparatus of claim 1 wherein the energy source device is a device for sourcing light energy and the energy sensor device is a device for sensing light energy.

9. The apparatus of claim 8 wherein the energy source device comprises one or more photodiodes and one or more lenses;
    wherein the one or more photodiodes are placed at or near the focal points of the one or more lenses;
    wherein the energy sensor device comprises one or more photodetectors and one or more lenses; and
    wherein the one or more photodetectors are placed at or near the focal points of the one or more lenses.

10. The apparatus of claim 1 wherein the energy source device is a device for sourcing acoustic energy and the energy sensor device is a device for sensing acoustic energy.

11. The apparatus of claim 10 comprises a microphone, an acoustic transducer, and an amplifier;
   wherein the acoustic transducer measures a portion of the acoustic energy generated by the microphone and transmitted through the filter;
   wherein the amplifier amplifies an electrical signal generated by the conversion of the portion of the acoustic energy into electrical energy; and
   wherein the acoustic transducer is a piezoelectric device.

12. A method for generating and communicating a signal for a filter comprising the steps of:
   placing an energy source device on a first side of the filter;
   placing an energy sensor device on a second side of the filter;
   transmitting a quantity of energy from the energy source device placed on the first side of the filter;
   receiving a portion of the quantity of energy transmitted through the filter at the energy sensor device laced on the second side of the filter;
   measuring the portion of the quantity of energy; and
   generating and communicating a filter maintenance alert based on the measured value of the portion of the quantity of energy.

13. The method of claim 12 further comprising:
   comparing the measured value of the portion of the quantity of energy with a predetermined threshold value for the portion of the quantity of energy;
   determining if the measured value is less than or equal to the predetermined threshold value; and
   generating and communicating the filter maintenance alert if the measured value is less than or equal to the predetermined threshold value.

14. The method of claim 12 further comprising:
   extending one or more actuator arms to place the energy source device on the first side of the filter and to place the energy sensor device on the second side of the filter in response to one or more control signals received from a control device; and
   activating the energy source device and the energy sensor device in response to the one or more control signals to measure the portion of the quantity of energy.

15. The method of claim 12 further comprising:
   determining the value of a blockage parameter based on the value of the portion of the quantity of energy;
   comparing the value of the blockage parameter with a predetermined value of the blockage parameter;
   generating the alert based on the comparison; and
   communicating the alert to a user device or to a server computer.

16. A filter system comprising: an energy measurement device and an alert signal generation device;
   wherein the energy measurement device places an energy source device on a first side of a filter and an energy sensor device on a second side of the filter responsive to one or more control signals;
   wherein the energy measurement device measures a portion of a quantity of energy transmitted from the energy source device to the energy sensor device responsive to the one or more control signals; and
   wherein the alert signal generation device generates an alert signal based either on the comparison of the measured value of the portion of the quantity of energy with a predetermined threshold value of the portion of the quantity of energy or on the comparison of the value of a parameter indicative of a degree of blockage and derived from the measured value of the portion of the quantity of energy with a predetermined threshold value of the parameter.

17. The system of claim 16 wherein the alert signal generation device comprises a CPU, a memory and a network communication link;
   wherein the CPU generates the one or more control signals responsive to the execution of a computer program stored in the memory;
   wherein the CPU sends the one or more control signals to the energy measurement device using the network communication link;
   wherein the CPU receives the measured value of the portion of the quantity of energy from the energy measurement device;
   wherein the CPU generates the alert signal based on the measured value; and
   wherein the CPU sends the alert signal to a user device.

18. The system of claim 16 wherein the measurement device comprises a housing for the measurement device, a communication device, one or more actuator controllers, an energy source controller, an energy sensor controller, one or more actuator arms, and an antenna;
   wherein the housing is mounted on the frame of the filter or on a part of an air circulation system in which the filter is installed;
   wherein the energy source device and the energy sensor device are attached to the one or more actuator arms;
   wherein the communication device formats and sends the one or more control signals to the one or more actuator controllers, the energy source controller, and the energy sensor controller;
   wherein the energy measurement device extends the one or more actuator arms to place the energy source device and the energy sensor device at the first side and at the second side of the filter respectively responsive to the one or more control signals;
   wherein the energy source device and the energy sensor device are activated responsive to the one or more control signals;
   wherein the energy sensor device measures the value of the portion of the quantity of energy responsive to the activation;
   wherein the sensor controller sends the measured value to the communication device; and
   wherein the communication device formats the value and sends the formatted value to the alert signal generation device via the antenna.

19. The system of claim 16 further comprising a mobile device, an application program and a user interface;
   wherein the application program is stored in the mobile device;
   wherein the application program communicates with the alert signal generation device via the user interface;
   wherein a user of the mobile device inserts a data indicative of either the predetermined threshold value of the portion of the quantity of energy or the predetermined threshold value of the parameter via the user interface; and
   wherein the mobile device sends the data to the alert signal generation device.

20. The system of claim 17 wherein the CPU receives a message from the mobile device indicative of a change in either the predetermined threshold value of the portion of the quantity of energy or the predetermined threshold value of the parameter; wherein the message includes an information on a new value of either the predetermined threshold value of the portion of the quantity of energy or the predetermined threshold value of the parameter; and wherein the CPU stores the new value responsive to receiving the message.

21. The system of claim 16 wherein the alert generation device receives an identification data and a global positioning system (GPS) data from a plurality of the energy measurement devices; wherein the alert generation device performs a statistical analysis on the data indicative of the degree of blockage from the plurality of the energy measurement devices; wherein the alert generation device generates a filter maintenance recommendation of the filters in a geographical region based on the statistical analysis; and wherein the alert generation device sends the recommendation to a computer server belonging to a service provider or to a device manufacturer.

22. The system of claim 16 wherein the energy measurement device is compliant with IoT standards specifications defined by 3GPP and ITU organizations; and wherein the energy measurement device uses the IoT capabilities defined in the IoT standards specifications to interface with a 4G or a 5G network and to communicate with the alert signal generation device.

\* \* \* \* \*